United States Patent [19]

Harmstorf

[11] 4,362,436

[45] Dec. 7, 1982

[54] METHOD AND DEVICE FOR EMBEDDING CABLES OR THE LIKE INTO AN UNDERWATER GROUND

[75] Inventor: Rudolf Harmstorf, Hamburg, Fed. Rep. of Germany

[73] Assignee: Hydro-Jet System Establishment, Vaduz, Liechtenstein

[21] Appl. No.: 155,529

[22] Filed: Jun. 2, 1980

[30] Foreign Application Priority Data

Jun. 1, 1979 [DE] Fed. Rep. of Germany ....... 2922410

[51] Int. Cl.³ .......................... F16L 1/04; E02F 5/08
[52] U.S. Cl. ........................................ 405/161; 37/63; 405/164
[58] Field of Search .................... 405/159–164, 405/174; 37/56, 77, 62–64, 69

[56] References Cited

U.S. PATENT DOCUMENTS

| | | | |
|---|---|---|---|
| 3,004,392 | 10/1961 | Symmank | 405/163 |
| 3,333,432 | 8/1967 | Hale et al. | 405/164 |
| 3,338,060 | 8/1967 | Harmstorf | 405/163 |
| 3,897,639 | 8/1975 | Hansen | 37/63 X |
| 3,978,679 | 9/1976 | LeComte | 405/159 |
| 4,117,689 | 10/1978 | Martin | 405/163 |

*Primary Examiner*—Dennis L. Taylor
*Attorney, Agent, or Firm*—Bucknam and Archer

[57] ABSTRACT

A cable or the like is embedded into an underwater ground by introducing the cable into a zone of reduced density which is produced progressively in the ground by a flushing process; upon meeting with ground formations which are only insufficiently loosened by the flushing process, mechanical loosening tools assist the loosening action of the flushing process. Preferably, the mechanical loosening tools are automatically put into and out of operation in dependence upon the depth of penetration of the flushing process.

50 Claims, 4 Drawing Figures

METHOD AND DEVICE FOR EMBEDDING CABLES OR THE LIKE INTO AN UNDERWATER GROUND

BACKGROUND OF THE INVENTION

The invention relates in the first instance to a method for embedding a cable or the like into an underwater ground, in which method the cable is introduced into a zone of reduced density which is produced progressively in the underwater ground by a flushing process.

Furthermore, the invention relates to an apparatus which is suitable for performing the method, for the embedding of cables and the like into an underwater ground; the apparatus comprising an embedding vehicle which is movable, preferably drivable, on the underwater ground, the embedding vehicle having a guide device being in guiding relationship with the cable to be embedded; and a flushing colter which is adjustable to various flushing depths below the vehicle, the colter comprising at least one cable channel and being provided with flushing nozzles, the colter preferably being pivotable about a transverse axis of the embedding vehicle to thereby adjust the colter to different flushing depths, the colter preferably being coupled to a vibration device and preferably being provided with tearing teeth.

The method and the apparatus of the kind described above are known, for example from the U.S. Pat. No. 3,333,432.

In numerous cases of application, it is not possible to draft a cable laying path which extends throughout through ground formations suitable for flush-embedding. In such cases, the laying path hitherto was drafted so that it comprises as few as possible, and continuous, sections through more solid ground formations which are not suited for being fluidized by a flushing process. Then, those sections were especially prepared for the embedding process, for instance by blasting a trench, prior to the embedding operation proper which for the rest was performed by a flushing process. Such preparatory work requires a high expense with respect to labour time and the use of special devices for the working of the underwater ground. Thereby, the typical advantages of the flushing process, particularly its high speed of operation, and its economy, were practically completely destroyed in many cases.

It is the object of the invention to provide a method and an apparatus for embedding a cable or the like into an underwater ground, in which the typical advantages of the flushing or fluidizing technique are retained even if non-flushable ground formations occur in sections of the laying path.

SUMMARY OF THE INVENTION

According to the invention, the said object is attained, with respect to the method, by a method of the kind described initially, which is characterized in that upon meeting with ground formations which are only insufficiently loosened by the flushing process, the underwater ground is mechanically loosened in the flushing area during performing the embedding process.

In the method according to the invention, the mechanical loosening thus is not an extra operation to be performed at great expense beforehand; rather, it is performed in the flushing area in the course of the embedding process as it becomes necessary, the embedding process for the rest being performed by flushing, whereby the success of the mechanical loosening can be recognized immediately, or will be demonstrated automatically by the continuing of the movement of a flushing device which is under the action of a pulling force. Thus, the extent and the duration of the mechanical loosening work can be limited to the degree which is just necessary, and this can be also done automatically.

Preferably, the mechanical loosening is performed in an area which, in the direction of the embedding process, is disposed ahead of the center of the flushing area. In this manner, the mechanical loosening contributes best to the acceleration of the embedding process.

A simple criterion for determining whether the mechanical loosening is additionally necessary, is available in a very simple manner in the form of the flushing depth which is obtained exclusively by the flushing process. The flushing depth also can be easily sensed and used as a switch-on signal for initiating the mechanical loosening. Accordingly, a particularly advantageous embodiment of the method according to the invention, which embodiment is particularly suited for being performed automatically, is characterized in that the mechanical loosening is initiated if the flushing depth obtained with the flushing alone decreases below a predetermined minimum value, in that the mechanical loosening is performed to a working depth which is greater than the minimum value but smaller than the maximum flushing depth obtainable in a soft ground, and in that the mechanical loosening is terminated if the flushing depth has exceeded the working depth of the mechanical loosening for a predetermined time period. It will be readily understood that this embodiment can be performed very easily automatically; in doing so, provision can be made, by dimensioning the said time period sufficiently large, to prevent a premature termination of the mechanical loosening, particularly in the transition zones between harder ground formations which require mechanical loosening, and softer, flushable ground formations,—transitions of that kind often still contain localized aggregations of harder ground constituents so that without the said delay time, the mechanical loosening process would be unnecessarily often switched on and off.

According to a further development of the invention, the method according to the invention can be successfully employed in an even larger number of applications if two levels of the intensity of the mechanical loosening can be selectively chosen, the level of the higher intensity being used if during operation at the level of the lower intensity, the pulling force which is necessary to proceed with the embedding process exceeds a predetermined switching value. In this embodiment, the kind, power requirement, and time requirement of the mechanical loosening can be adapted even better to the various possible ground formations; for instance, with the initially used level of the lower intensity, a relatively high embedding speed may still be obtained, whereas if only mechanical loosening tools of high intensity were present, as they are necessary for particularly hard ground formations, only a low embedding speed would be possible as it is typical for tools of that kind.

In a very simple manner, the depth of penetration which is obtained with the loosening at high intensity may serve as a criterion for determining whether a transition from the higher to the lower level of intensity is possible. Correspondingly, a particularly advantegeous development of the invention is characterized in that the loosening at the higher level of intensity is performed with a depth of penetration which is dependent upon the degree of loosening obtained, and is terminated if the depth of penetration has exceeded a predetermined switching value over a predetermined period of time. The delay time period again has the puspose to prevent too frequent a changing between the high and the low level of the loosening intensity. It will be understood that when applying this embodiment of the invention, the starting and stopping of the loosening at the higher level of intensity may be performed automatically in a particularly simple manner. As has been stated above, the same is also true for the starting and stopping of the mechanical loosening per se. Thus, the method according to the invention may be automated particularly easily and, therefore, is particularly suited for cases of application in which the employing of human work would involve excessive costs or risks.

In accordance with the invention, an apparatus of the kind initially described is particularly suited for attaining the object of the invention, which apparatus is characterized in that the embedding vehicle is additionally provided with a mechanically acting ground loosening device which comprises at least one loosening tool and can be selectively put into effect.

In the apparatus according to the invention, the devices for the normal flush-fluidizing, namely the flushing colter, as well as a mechanically acting additional ground loosening device are provided both one one and the same embedding vehicle. Thus, the apparatus according to the invention can be employed in the same manner as a conventional flushing device, for instance as described in the already mentioned U.S. Pat. No. 3,333,432; when meeting with harder ground formations, it is not necessary to interrupt the flushing process and to bring up and put into operation any new equipment; rather, it is merely necessary to put into effect the additional ground loosening device, which is already provided on the embedding vehicle, until the harder ground formation has been traversed.

The ground loosening device appropriately is arranged in the flushing area of the flushing colter; in most cases, this will be automatically the case due to the, naturally, restricted size of the embedding vehicle. The arrangement in the flushing area offers the advantage that upon meeting with more solid ground formations, the embedding vehicle need not be moved to and fro; a continued movement in the embedding direction will suffice. The working and progressing speed then obtainable will be particularly high if the ground loosening device is arranged ahead of the flushing colter, seen in the embedding direction.

Particular advantages will be obtained with an embodiment of the device according to the invention, which is characterized in that the flushing colter is adapted to be subjected to a predetermined downwards biasing force, and may be pushed upwards against that biasing force, and in that the mode of operation of the embedding device is controllable in dependence upon the flushing depth of the biased flushing colter so that a reduction of the colter flushing depth below a predetermined minimum value is counteracted.

It will be readily understood that numerous possibilities for controlling the mode of operation in dependence upon the flushing depth of the flushing colter will be available to the skilled artisan. It is decisive that the flushing depth, represented by the downwards stroke of the flushing colter, is a value which may be measured in a very simple manner, whereby an inexpensive equipment will suffice to obtain a signal which indicates that the flushing depth of the colter has decreased below the minimum, and/or automatically causes counter measures to be taken which counteract the decreae of the flushing depth below the minimum value, for instance by automatically putting the ground loosening device into operation, and/or reducing the advancing speed of the embedding vehicle so that a longer operating time per unit length of the embedding path is available to the flushing colter.

In a further development of the invention, it is appropriate that the biasing force of the colter increases if the flushing depth of the colter increases. This will result in a clear interrelation between the colter flushing depth and the strength of the ground. That desirable characteristic of the colter biasing force can be obtained in various simple ways. A particularly simple structure is obtained if a hydraulic cylinder which in any case is provided for raising and lowering the flushing colter, is employed for producing the biasing chacteristic by providing, for the supply of the hydraulic cylinder, a pressure control device which prescribes a desirable dependence of the biasing force upon the downwards stroke of the colter in the flushing operation.

Another particularly simple possibility for obtaining the desired characteristic of the biasing force will be obtained if the flushing colter is supported pivotally about a transverse axis of the embedding vehicle to provide for a lifting and lowering movability; then, simply the weight distribution of the flushing colter can be designed so that the desired interrelation between the stroke depth of the colter and the downwards directed biasing force will be obtained.

Still further, the desired characteristic of the biasing force, i.e. an increase of the downwardly acting biasing force of the flushing colter as the flushing depth increases, can be also obtained very easily by supporting the flushing colter at the embedding vehicle via at least one spring. This measure also can be employed additionally to other measures for producing the desired characteristic of the biasing force.

As has been already described above, the flushing depth will automatically adapt itself to the characteristic of the ground at flushing depths which are larger than the said minimum value, without particular additional measures being necessary; thus, it is appropriate if in that range of colter flushing depths, the mode of operation of the embedding apparatus is controllable independently of the flushing depth of the colter.

BRIEF DESCRIPTION OF THE DRAWINGS

The invention will be subsequently described by means of examples in connection with the drawings, in which.

DETAILED DESCRIPTION OF THE DRAWINGS

Figure 1:
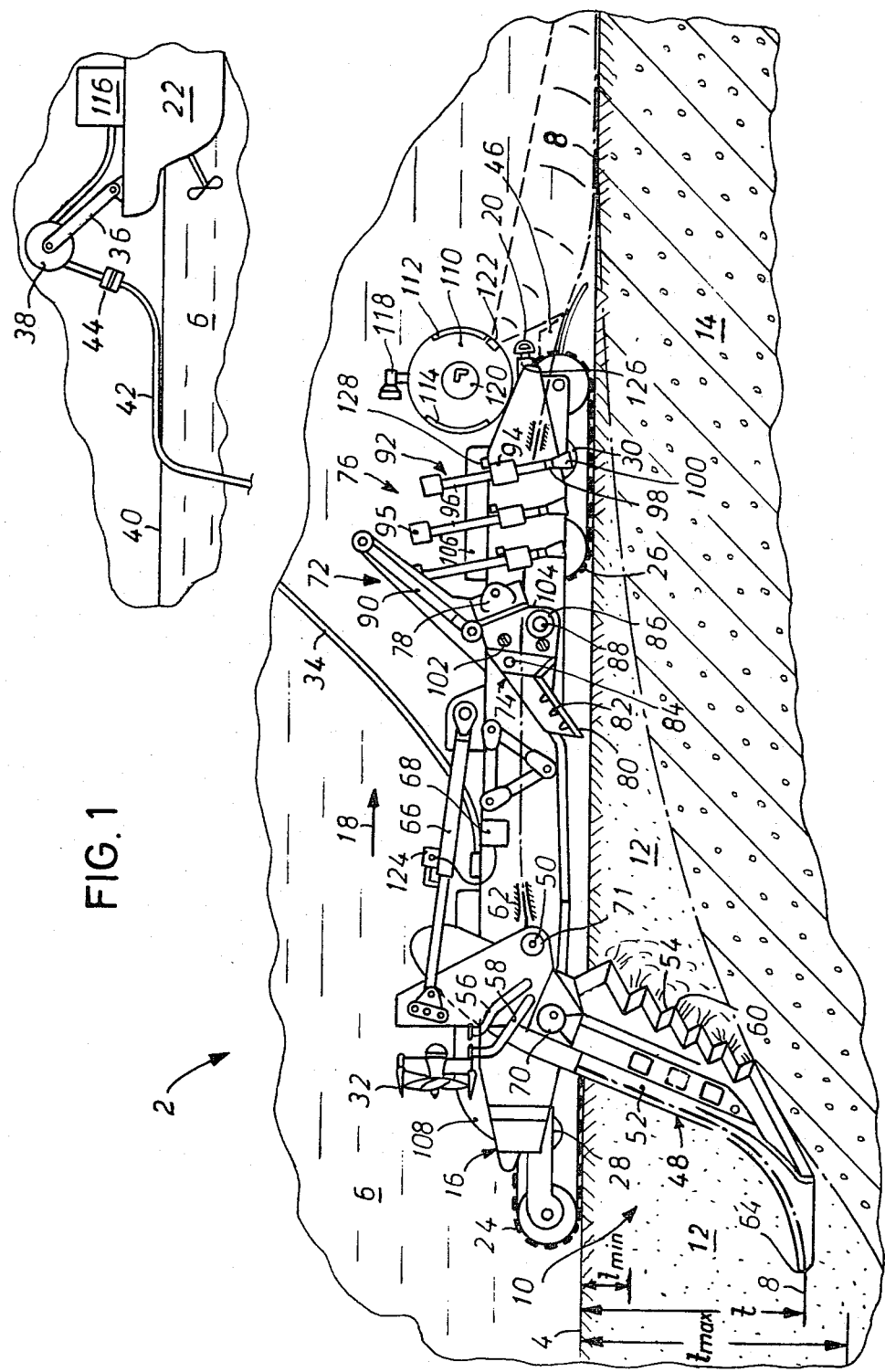
FIG. 1 is a diagrammatic illustration, in the manner of a vertical sectional view, of an embedding apparatus in accordance with the invention.

FIG. 1 illustrates, in an entirely diagrammatic illustration, an apparatus 2 for embedding a cable 8 laid out on the bottom 4 of a body of water 6, into the underwater ground 10. In this case, it is assumed that the underwater ground is an ocean ground having zones of different constitution. In FIG. 1, the ground extends from left to right from a relatively loose and well-fluidizable sand layer 12 into a more solid boulder clay layer 14 which may be not readily flush-fluidized.

The apparatus 2 comprises an embedding vehicle 16 which may be moved on the water bottom 4 in the embedding direction 18. The embedding vehicle for instance may be pulled by an associated barge via a pulling cable (not illustrated) which is secured to an eye 20 at the forward end of the embedding vehicle. In most cases, however, it is more advantageous if the embedding vehicle has drive means of its own which are controllable and preferably also reversible because then, the embedding vehicle 16 may be more exactly steered and driven along the cable 8 which previously had been laid out on the bottom 4 of the water body. The directional reversibility of the drive means is advantageous in that bottom areas which are particularly strong and difficult to loosen may be traversed repeatedly, if necessary, until the desired embedding depth is obtained. In the embodiments illustrated, the embedding vehicle 16 comprises a bottom drive including a plurality of caterpiller drives 24 and 26 provided at the forward and rear ends, respectively, of the vehicle and being powered by hydraulic motors 28 and 30, respectively, as well as a flow drive in the form of a propeller 32 which also is powered by a hydraulic motor. The caterpiller drives offer the known advantage of being operative also on rough surfaces. The additional flow drive 32 will be able to produce thrust even in cases where the caterpiller drives find little entraining support on a bottom 4 of a water body.

The embedding vehicle is supplied with energy, air, communication connections, control signals and the like via an umbilical cable 34 leading to the barge 22, preferably via a outrigger crane 36 having a damping device 38, the crane being only diagrammatically indicated in FIG. 1. The umbilical cable 34 is constructed so that it has sufficient buoyancy to ensure that it cannot fall down ahead of the embedding vehicle 16, and always rises approximately vertically above the embedding vehicle 16 to the surface 40 of the water body 6 and extends from there to the stern of the barge 22 through a portion 42 floating at the surface. By this triangle connection of the umbilical cable 34 to the barge 22, it is made sure that normally, no excessive tensional load on the umbilical cable 34 can occur because that would require that first the portion 42 floating on the water is stretched into a position aligned with the remaining portions. Additional safety against excessive pulling loads on the umbilical cable 34 is provided by the dampening means 38.

During the embedding work, the barge 22 is held, by means of an automatic positioning device (not illustrated), at a position approximately one ship length ahead of the embedding vehicle 16, exactly above the cable 8 prelaid on the bottom 4 of the water body.

If the embedding vehicle 16 has a drive of its own, the embedding work normally can be continued also under bad weather conditions because the movements of the barge 22 will not influence the advancing of the vehicle 16. Under weather conditions which do not permit any work at all, the umbilical cable 34 extending from the barge to the embedding vehicle can be rapidly disconnected by means of a quick-disconnect coupling 44. That coupling comprises a quick-action lid which prevents the penetration of water into the ends of the umbilical cable; thus, the portion leading to the embedding vehicle 16 may be simply thrown overboards after the end of the cable has been marked by a buoy. Then, the barge 22 may retreat to a protective harbour, whereas the embedding vehicle 16 connected to the umbilical cable 34 may be safely left on the bottom 4 of the water body. Re-tracing of the cable end which is attached to the buoy (not illustrated) can be facilitated in known manner by providing a radio emitter in the buoy as a direction-finding means.

At the forward end, the embedding vehicle has a guide means 46 which is in a guiding relation with the cable 8 to be embedded, the guide means consisting in the simplest case of an inlet funnel having two sensors provided on the left hand side and the right hand side, respectively, of the cable entering path. The embedding vehicle 16 has a steering device controlled by the cable guide means 46, the steering means are here not described at detail. The forward caterpillar drive 26 is supported on a pivot mount to be rotatable about a vertical axis, and is adjustable into different positions about the vertical axis by means of a steering motor (not illustrated). The steering motor is controlled by the sensors of the cable guide means 46 so that the embedding vehicle 16 is steered along the prelaid cable 8. With an excessive curvature of the prelaid cable 8, danger exists that the cable will be overridden by the embedding vehicle. Therefore, it is appropriate to make the advancing velocity of the embedding vehicle 16 dependent upon the curvature of the prelaid cable ahead of the embedding vehicle so that if the radius of curvature of the cable drops below a predetermined value, the advancing velocity will be reduced to zero, and a signal indicating this condition will be produced. Then, for instance, the cable lying ahead of the embedding vehicle can be displayed transversely by means of a cable car so that a larger bend will be obtained, which the embedding vehicle is capable of advancing therealong. Design and construction of a safety device of that kind are readily possible for a skilled artisan, whereby a detailed description is not necessary in the present context.

At the embedding vehicle 16, a flushing colter 48 is supported to be adjustable to different flushing depths t below the embedding vehicle 16. In the embodiment illustrated, the variability of the flushing depth is obtained in that the flushing colter 48 is pivotally supported about a transverse axis 50 of the embedding vehicle. The flushing colter 48 has at least one cable channel 52 and is provided with flushing nozzles 54. Via feed conduits 56, 58, the flushing nozzles are supplied by a pump (not illustrated) with flushing liquid taken from the water body 6. In order to improve the embedding performance, tearing teeth 60 are provided at the front side of the flushing colter 48. The cable channel 52 extends from an end lying adjacent to the colter pivot axis 50, which end is also close to the end of a vehicle cable channel 62 provided in the vehicle body, to the pointed free end 64 of the flushing colter 48.

In the embodiment illustrated, a hydraulic cylinder 66 is provided to raise and lower the flushing colter 48, the cylinder being supplied from a pressure control device 68 and a control pump (not illustrated) preconnected thereto. The pressure control device 68 receives control signals via the umbilical cable 34.

In order to assist the flushing action of the flushing colter, the flushing colter is coupled to a vibration device 70, for instance simply by mounting at least one vibrator on the flushing colter 48. In order that the vibrations of the flushing colter cannot cause damage to the cable extending through the flushing colter, it is appropriate to support the cable channel 52 in rubber metal. In order that the vibrations of the flushing colter 48 may not adversely affect other parts of the embedding vehicle 16, it is to the purpose to also support the flushing colter 48 in vibration-dampening mounting means 71; also any mechanical coupling to other parts of the apparatus can be made through vibration dampening couplings which, however, are not illustrated here for reasons of simplicity.

By vibration-dampening measures, the throughpassing cable 8 can be protected against the vibrations of the flushing colter to a limited extent only. Thus, the vibration power of the flushing colter 48 cannot be optionally increased. For that reason, as well as for other reasons, the intensity of the flushing process is limited. Therefore, the embedding vehicle illustrated is additionally provided with a mechanically acting ground loosening device 72 which comprises at least one loosening tool and may be selectively put into effect. The ground loosening device 72 is arranged still in the flushing area of the flushing colter 48, and ahead of the flushing colter 48, seen in the embedding direction 18. Thereby, a particularly intense co-operation of the flushing colter 48 and the loosening device 72 is made possible, and in most cases, it is not necessary to move the embedding vehicle 16 to and fro. In the embodiment illustrated in FIG. 1, the ground loosening device 72 comprises a plurality of kinds of loosening tools of different intensity which may be selectively put into operation. In this manner, optimum loosening velocities can be obtained in an extended range of different ground characteristics. At more detail, the embedding vehicle illustrated comprises a light tool 74 which is suitable for loosening ground formations, for instance boulder clay, of moderate strength, and a plurality of heavy tools 76 for loosening more solid ground formations as for instance lime stone. Depending on the necessity, also other numbers of light and heavy tools may be provided. The light tool is disposed, seen in the embedding direction 18, between the flushing colter 48 and the heavy tools 76. This is to the purpose because then, upon advancing the embedding vehicle 16, the heavy tools can perform a preparatory loosening work for the subsequent light tools and the flushing colter. In the embodiment illustrated, the light tool 74 consists of a so-called ripper, that is essentially a tearing knife edge which can be put into strong vibrations by a high power vibrator 78. The ripper has a plurality of high pressure flushing nozzles 82 closely adjacent to its knife edge 80, which nozzles can be supplied with flushing liquid, via a pressure water connection 84, from a pump (not illustrated). The ripper 74 is an example for the generally prevailing possibility that at least one tool flushing nozzle is provided to a number of loosening tools in order to improve the loosening action of the tools in a simple manner. It should be noted that also the loosening tools may be supported in vibration-dampening mounting means if otherwise they might transmit undesirable vibrations to other parts of the embedding vehicle 16. Accordingly, the ripper 74 illustrated is pivotally supported at the vehicle body of the embedding vehicle 16 in a metal-rubber bearing 86 to be pivotable about a light tool pivot axis 88. The ripper furthermore is coupled to a controllable tool setting device 90 in the form of a hydraulic cylinder so that the ripper is movable between the rest position illustrated in FIG. 1, in which it does not act onto the bottom 4 of the water body, and the active position illustrated in FIG. 2, in which it engages the bottom of the water body. In this manner, the ripper cannot disturb the embedding process if the ripper is switched off and only the flushing colter 48 performs the embedding operation.

Figure 2:
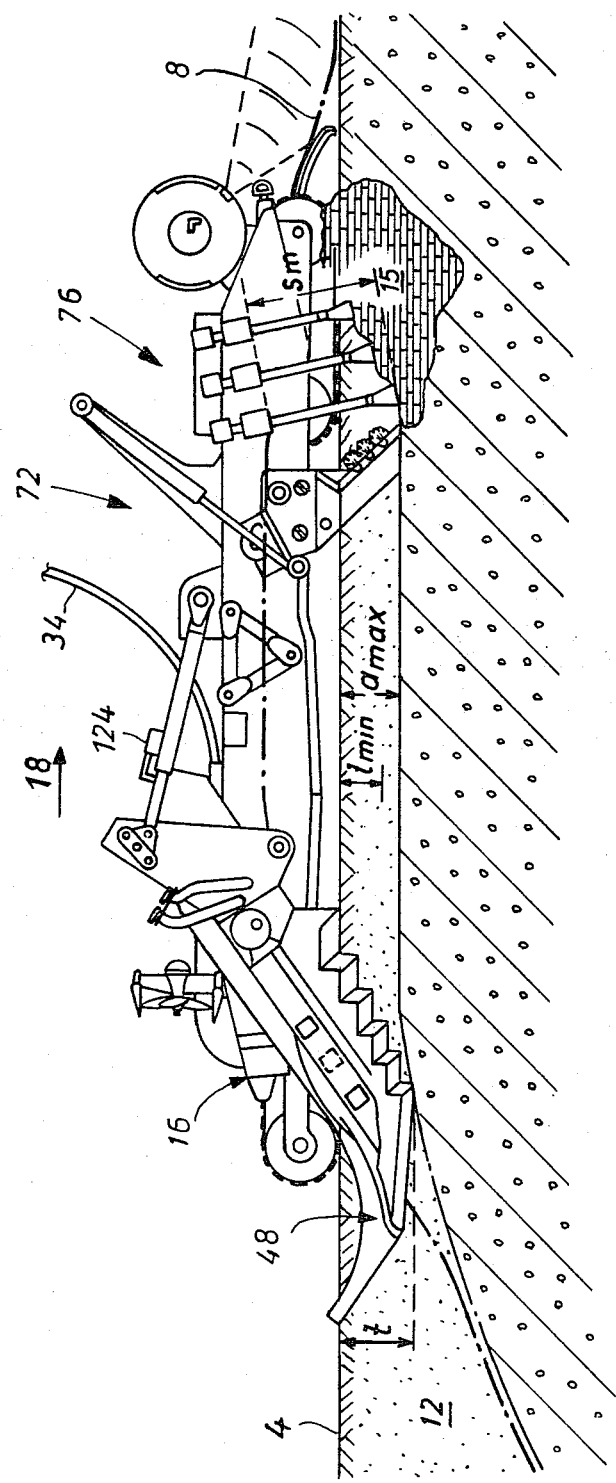
FIG. 2 is an illustration similar to FIG. 1, however, showing another operational phase of the embedding apparatus.

In the embodiment illustrated, the heavy tools 76 consist of chisels which are displaceable by means of controllable tool setting means 92 from the rest position shown in FIG. 1 into the active position shown in FIG. 2. Again, this will have the result that the heavy tools 76 cannot disturb the operation of the apparatus if the bottom of the water body is relatively soft and only the flushing colter 48 is in operation. The tool setting device comprises a drive socket 94 each and a fastening rod 96 guided and driven therein, the free end of which is provided with tool fastening means 98 for the tools proper, is this case chisels 100. The fastening means 98 are designed so that different loosening tools may be conveniently attached and exchanged. In a similar manner, also the light tool setting device 90 is designed so that different tools may be exchanged. In the embodiment illustrated, the ripper proper is attached to a base plate 104 by means of detachable fastening means 102. The easy exchangeability of the ground loosening tools offers the advantage that the embedding vehicle 16 may be equipped prior to its application with the very loosening tools which appear most appropriate for the ground structures in the laying area.

At the forward and rear ends of the embedding vehicle, trimming cells 106 and 108, respectively, are provided, which can be blown empty, whereby the weight distribution of the embedding vehicle can be varied as desired by more or less filling or blowing free the trimming cells. The trimming cells also may be designed so that they, when blown entirely empty, compensate the intrinsic weight of the embedding vehicle to the largest part or even totally, whereby the embedding vehicle can be easily moved to the surface of the water body. Since the weight control by means of trimming cells is known per se, a detailed description is not necessary in this connection.

In order that the embedding process can be supervised at the site and manually influenced and corrected, if necessary, an observation chamber is provided at the embedding vehicle 16, which chamber can be blown empty and includes a control station for supervising and manually influencing and/or controlling the embedding apparatus. In most cases, it is appropriate to provide the observation chamber, as illustrated in FIG. 1, at the forward end of the embedding vehicle. The processes being performed ahead of and behind the embedding vehicle can be observed through looking windows 112, 114.

In many cases, the embedding work will not offer particular difficulties, so that a remote observation and remote control will suffice. Therefore, it is appropriate to provide a second control station 116 on the barge 22, and a signal connection with the embedding vehicle 16. That signal connection will be effected via the umbilical cable 34. For purposes of remote observation, a television camera 118 is rotatably supported on the embedding vehicle at a point as high as possible, in the illustrated embodiment in the upper range of the observation chamber 110. The observation chamber 110 has a lock entrance 120 each on the starboard side as well as on the larboard side of the embedding vehicle 16 so that a diver who shall act as a crew for the observation chamber 110 always can enter the chamber 110 on the lee side of the embedding vehicle 16, depending upon the flow direction prevailing at the bottom of the water body. Generally, it will suffice to design the observation chamber 110 for a crew consisting of one man only. The crew may be exchanged by the aid of a diving bell provided at the barge 22 which is continuously present ahead of the embedding vehicle 16. These devices are not illustrated in the Figures. Since the observation chamber 110 can be supplied with all necessary operation means and with energy from the barge 22 via the umbilical cable 34, also extended stays of the crew in the observation chamber 110 are possible, so that, more particularly, it will not be necessary to interrupt an embedding process merely because of an exchange of the crew.

In order that the position of the prelaid cable 8 can be sensed and indicated even under conditions of poor visibility, an electronic cable locating device 122 is provided in the forward area of the embedding vehicle 16.

The flushing colter 48 may be subjected to a predetermined downward biasing force and accordingly may be pressed upwards against that biasing force, and the mode of operation of the embedding apparatus is controllable in dependence upon the flushing depth t (which is equal to the extension depth of the flushing colter 48 below the embedding vehicle 16) of the biased flushing colter 48 so that the apparatus counteracts a reduction of the flushing depth t below a predetermined minimum value $t_{min}$. As has been already described above, the embedding depth will in this manner be automatically adapted to the strength of the bottom of the water body prevailing in the individual case, as long as the flush-embedding can be still performed at all. To that end, it is particularly advantageous if the biasing force of the colter increases as the colter flushing depth increases. The biasing force for the flushing colter 48 can be produced in any manner. According to a particularly simple method, the setting device 66 which is provided for raising and lowering the flushing colter 48 is also employed to produce the biasing force. In the embodiment illustrated, the hydraulic cylinder 66 provided to that purpose is supplied from the pressure control device 68 so that the desired biasing force and the desired dependence of the biasing force upon the flushing depth t is obtained in the flushing operation. The flushing depth t is sensed by a sensor 124 which in the embodiment illustrated co-operates with the rod of the hydraulic cylinder 66. Other depth sensors can be employed also. The depth signal t is fed into the pressure control device 68 and serves there to produce the desired biasing force characteristic for the flushing colter 48, particularly in such a manner that the colter biasing force increases as the colter flushing depth t decreases, because then the desirable mode of operation is obtained that the flushing depth will decrease in more solid grounds where a smaller embedding depth will be sufficient; it may be said that the biased flushing colter 48 then simulates a cable-endangering disturbing influence, for instance a drag anchor which also penetrates the deeper into the ground the less solid the ground is.

It will be understood that by means of the control stations in the observation chamber 110 or on the barge 22, the pressure control device 68 may be also switched so that it will only be capable of effecting the raising and lowering of the flushing colter 48, as it is desirable outside of the flushing process or in particular cases if a flushing process shall be controlled completely manually.

Producing the biasing force of the flushing colter by means of the setting device 66 which is in any case provided for raising and lowering the flushing colter, is particularly simple and makes possible a great variety of biasing force characteristics. The characteristic which is more particularly desirable, i.e. that the biasing force increases as the flushing depth t decreases, can be obtained or amplified by other simple structural measures also. In the simplest case, the flushing colter can be supported at the embedding vehicle via at least one spring. This possibility is not illustrated in the Figures. It will be understood that because of the usual spring characteristic, also the desired decrease of the biasing force with an increasing flushing depth is then readily obtained. Another simple possibility consists in that in the case of a flushing colter which as in the embodiment illustrated is supported to be pivotable about a transverse axis 50, the weight distribution of the flushing colter 48 with respect to the transverse axis 50 is designed so that the desired dependence between the colter flushing depth t and the downwardly directed biasing force is obtained. In the embodiment illustrated, it will readily be recognized that the center of gravity of the flushing colter 48 is disposed leftwards of and below the transverse axis 50, whereby the free end of the flushing colter 48 will press the more onto the bottom therebelow the higher the flushing colter is lifted.

The parameters required for the automatic or manual operation of the flushing apparatus can be produced by known means. For example, the pulling eye 20 provided at the forward end of the embedding vehicle 16 is coupled to the embedding vehicle 16 via a force measuring device 126 so that a pulling force signal can be obtained and employed to control the apparatus. The heavy tools 76 have limit switches 128 which emit a signal when the heavy tools have been extended to their maximum working depth. In the case of the illustrated intrinsic drive, the power consumed by the drive motors 28 and 30 will also be measured, and a pulling force signal is derived from the measured value, which approximately corresponds to the pulling force signal which is delivered by the force measuring device 126 when the vehicle is hauled at the pulling eye 20.

The interlinking and employing of the various signals will be briefly described in the subsequent description of the operation of the apparatus. The devices necessary for producing and processing the signals may be conventional and thus will be not described here at detail.

FIG. 1 shows the embedding vehicle 16 during the flushing operation in a soft and easily fluidizable ground, for instance sand. The biased flushing colter 48 has adjusted itself to a flushing depth t which is close to the maximum value $t_{max}$ and in any case is considerably larger than the minimum value $t_{min}$, the underpassing of which will put the additional ground loosening device 72 into operation. The sensor 124 thus delivers a depth signal which holds the loosening device 72 in the rest position illustrated. This condition remains unchanged as long as the flushing depth remains larger than $t_{min}$. In this range of pure flushing operation, it may be to the purpose for making the embedding result more continuous to control the advancing speed of the embedding vehicle 16 in dependence upon the flushing depth t so that the advancing speed is reduced when the flushing depth t becomes smaller. In this manner, moreover, the pure flushing operation can be continued also in still relatively solid grounds, because the flushing and fluidizing then will be performed more slowly and thus with a better effect. The means necessary for controlling the driving or advancing speed in dependence upon the flushing depth can be readily devised by skilled people; a detailed description therefor is superfluous. In many cases, however, also a simpler mode of operation will be sufficient, in which in the range of flushing depths t which are larger than the minimum value $t_{min}$, the mode of operation of the embedding device is controllable independently of the colter flushing depth t.

It will be understood that the biasing and depth-control of the flushing colter 48, as well as the putting into operation of the ground loosening device 72, can be controlled manually from the control station in the observation chamber 110 or the control station 116 on the barge 22. However, an extensively automatic mode of operation will be preferred because this will exclude to a great extent that the embedding device and/or the cable will become damaged due to operational mistakes.

In a first line, it is characterizing for the automatic mode of operation that the ground loosening device 72 can be automatically put into operation when the colter flushing depth t falls below the minimum value $t_{min}$. In the embodiment illustrated, in which several kinds of loosening tools are provided in the loosening device 72, first the loosening tool is put into operation which is the lightest one and/or has the highest speed of operation; in this case, this is the light tool 74 (the ripper). The loosening device 72 will be started as soon as the depth sensor 124 delivers the signal $t_{min}$ to a signal processing circuit (not illustrated) which then effects that the light tool 74 will be pivoted by its setting device 90 into the operative position shown in FIG. 2, and will be put into operation. In the embodiment illustrated, the vibrator 78 is additionally switched on, the vibrator being preferably adjustable with respect to its vibration power. At the same time, also the tool flushing nozzles 82 of the ripper are put into operation. The ground loosening device 72 has a maximum working depth $a_{max}$ (FIG. 2) which is larger than the minimum value $t_{min}$ of the colter flushing depth t but smaller than the maximum value $t_{max}$ of the colter flushing depth obtainable in soft grounds. In the embodiment illustrated, the light tool 74 has the fixed maximum working depth $a_{max}$. Then, the device will at first operate so as if the ground loosening device 72 were equipped with the light tool 74 only. As long as the loosening effect of the light tool 74 is sufficient, the pulling force signal f delivered from the force measuring device 126 or derived from the drive power of the motors 28, 30 will remain below a predetermined switching value $f_s$. Then, the light tool 74 will produce a trench filled with loosened material, which can be easily passed through and further enlarged by the subsequently following flushing colter 48. If, in doing so, the flushing depth t, i.e. the extension depth of the flushing colter 48, will become larger by a certain amount than the working depth of the ground loosening device 72, i.e. the working depth $a_{max}$ of the light tool 74 which initially is along in operation, the sensor 124 or a signal generating device (not illustrated) being in connecton therewith will deliver a switch-off signal for the ground loosening device 72 because the increasing tendency of the flushing depth t indicates that the embedding vehicle is again over lighter ground formations. However, in order to avoid too frequently a switching on and off of the loosening device 72, a delay device (not illustrated) is provided which lets the switch-off signal become effective only after a predetermined time period for actually switching off the loosening device 72.

If during the operation of the light tool 74, the pulling force F necessary for advancing the embedding vehicle 16 exceeds a predetermined switching value $F_s$, the heavy tool 76 will be automatically put into operation. Thereby, the range of automatic operation of the embedding apparatus is extended to hard ground formations 15 which are particularly difficult to loosen. Upon the occurrence of this heavy tool switch-on signal, the heavy tools are brought into the operative position illustrated in FIG. 2. In the embodiment illustrated, this will be done by the setting devices 94 which will put the heavy tools during their operation under a downwardly directed biasing force. The heavy tools 76 are put into operation. More particularly, they can disintegrate rocks, wall structure, and other harder ground formations, and make them suitable for the subsequent further disintegration and flushing away by means of the light tools and the flushing colter 48, respectively. However, since the heavy tools consume considerable energy and are subject to relative rapid wear, their operating time will be restricted to the extent absolutely necessary. This is obtained by producing a switch-off signal for the heavy tool as soon as the heavy tool 76 reaches its maximum extension depth $s_m$ and thus indicates that at the bias applied, the ground of the water body obviously is again soft enough to become loosened and displaced by the subsequent light tools or even the flushing colter 48 alone. However, in order to prevent too frequently a switching on and off of the heavy tools 76, the switch-off signal preferably will be made effective via a delay device (not illustrated) which will make the switch-off signal effective for switching off the heavy tool 76 after a predetermined delay time only.

Figure 3:
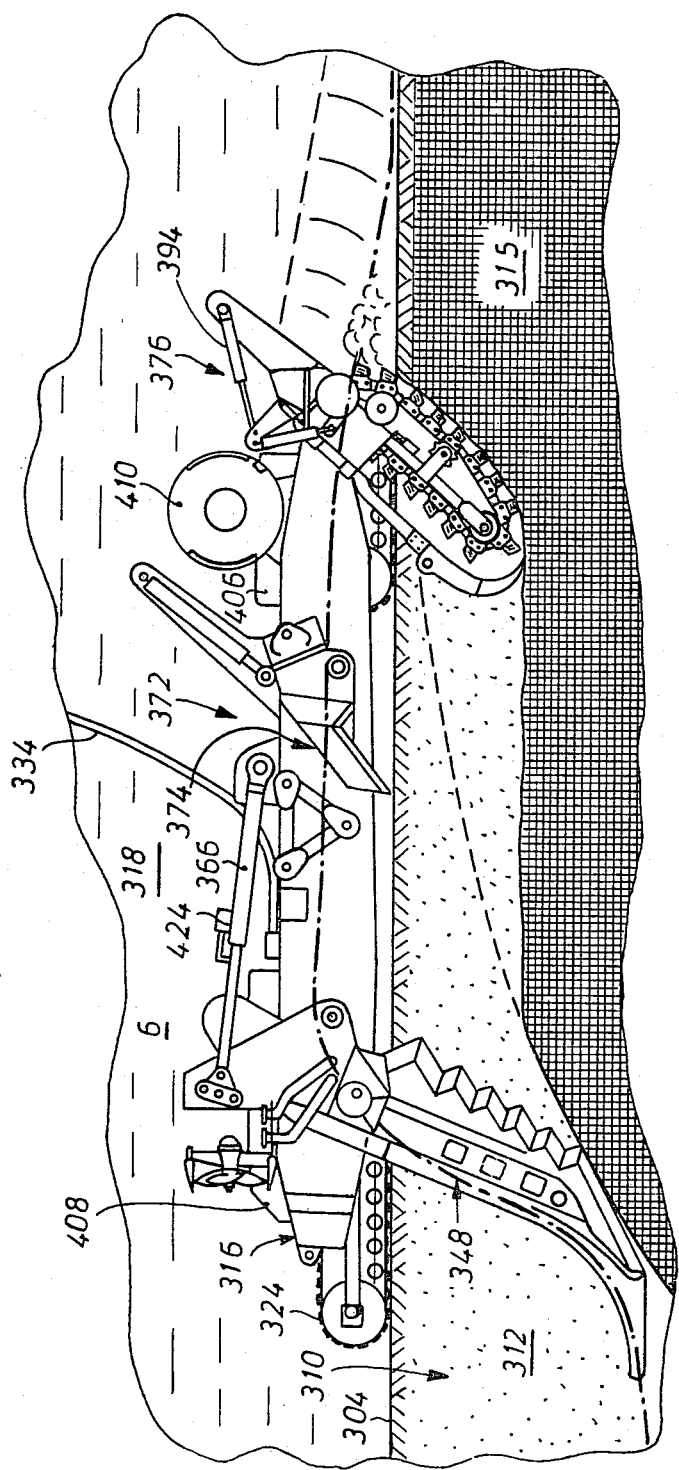
FIG. 3 is an illustration, shown in a similar mode as FIGS. 1 and 2, of another embodiment of an embedding vehicle of an embedding apparatus in accordance with the invention.

FIG. 3 illustrates an embedding vehicle 316 which comprises a heavy tool 376 in the form of a milling chain. The mode of operation is the same as with the device according to FIGS. 1 and 2. Therefore, the associated previous description can also be applied, and in FIG. 3, the same reference numerals are used as in FIGS. 1 and 2, however, increased by 300.

Figure 4:
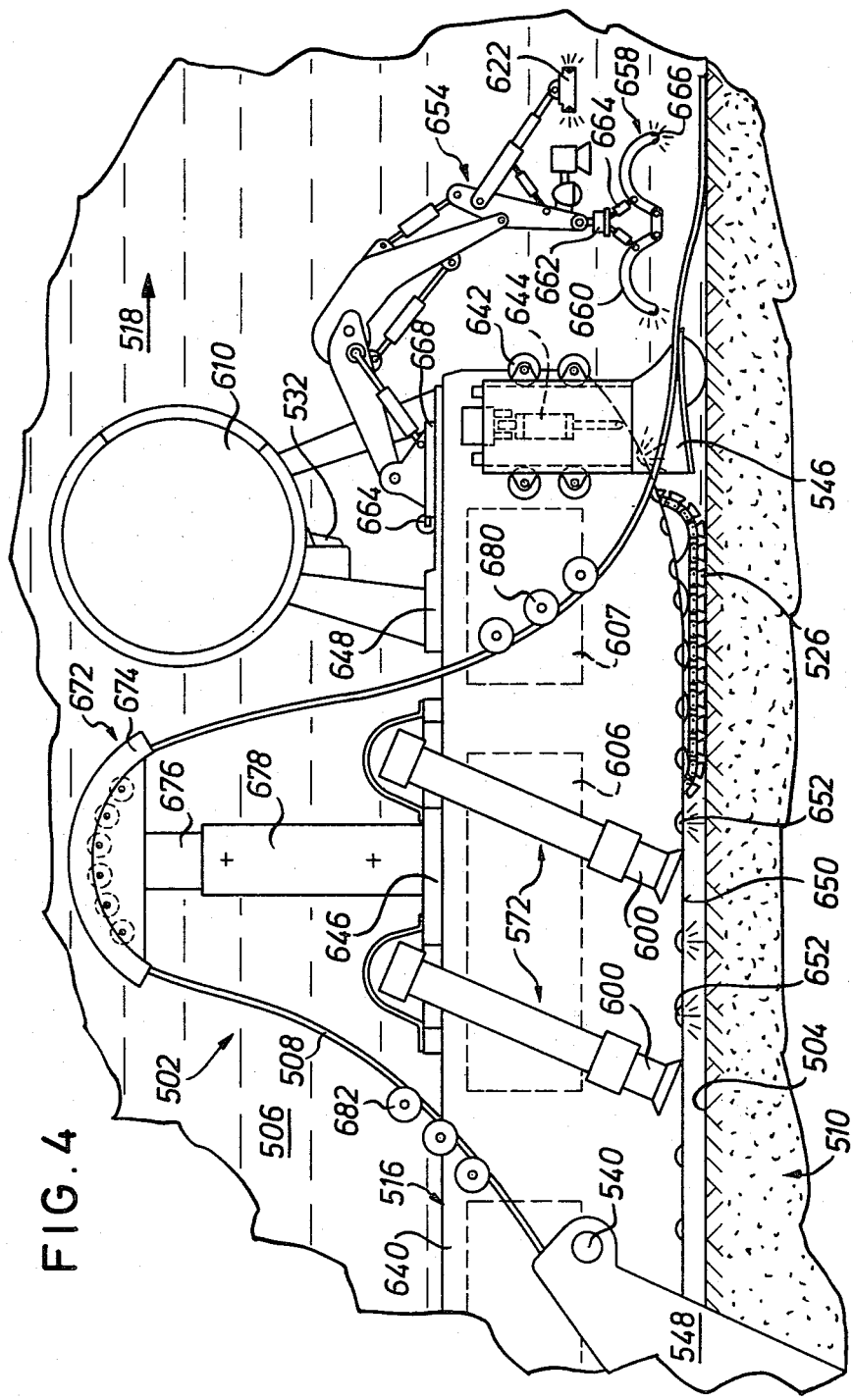
FIG. 4 is a diagrammatic partial illustration, shown in a mode similar to FIGS. 1 to 3, of another embodiment.

FIG. 4 shows diagrammatically a forward end portion of another embodiment for which the same reference numerals are used as in FIGS. 1 and 2, however, increased by 500. Thus, insofar reference is made also to the description of FIGS. 1 and 2.

The embedding vehicle 516 of FIG. 4 comprises two pontoon bodies arranged at a distance side by side in the forward advancing direction 518. In FIG. 4, only one pontoon body 640 can be seen. Each pontoon body has, in a lateral outer marginal portion, a bottom drive system including a front caterpillar drive 526 and a rear caterpillar drive which cannot be seen in FIG. 4. Between the pontoon bodies, a flushing colter 548 ist rotatably supported on a transverse shaft incorporating the transverse axis 540, the shaft extending between the two pontoon bodies. Furthermore, a ground loosening tool 572 is provided between the pontoon bodies, which in the embodiment illustrated comprises a plurality of downwardly extensible chisels 600. At the forward end of the embedding vehicle 516, a cable guide device 546 is arranged which is supported in an anti-friction bearing 642 is to be vertically displaceable, and which can be adjusted vertically by means of a hydraulic cylinder 644.

The two pontoon bodies are interconnected by the support means for the flushing colter and the loosening tools, as well as by bridges 646, 648. An observation chamber 610 is arranged on the bridge 646. Laterally thereof, flow drives in the form of propellers 532 are provided. In the pontoon bodies, trimming cells 606, 607 are provided which may be blown empty. Thereby, the weight and the trimming position of the embedding vehicle 516 may be changed. In order that sufficient weight can be applied also on ground formations less capable of bearing, it is appropriate that the embedding vehicle 516 has at least one relatively large lower sliding surface. In the embodiment illustrated, each of the two pontoon bodies is designed to have below a sliding surface 650 which at the forward end terminates with an upward curvature. In order that the sliding can be assisted, a plurality of water outlet points 652 are provided in the sliding surfaces 650, through which flushing water may be selectively emitted. Since normally, a sliding will be necessary on soft grounds only, i.e. when only little flushing water will be required for the embedding process, the capacity of the flushing water pump (not illustrated in FIG. 4) need not be increased for purposes of supplying the water outlet points 652.

The design of the sliding surfaces 660 will depend upon the ground formations most frequently occurring. Also, it is readily possible to provide the sliding surfaces with narrower skids, or to provide such skids interchangeably so that a sliding forward movement will be possible also on relatively solid ground formations. For applications in which sliding is frequently necessary, loosening tools may be advantageously used which also have an entraining action, for instance milling chains of the kind of the heavy tool 376 according to FIG. 3.

On the other hand, it may be advantageous to provide the bottom drive means with a freewheel gear, particularly if they are designed as caterpillar drives, so that during sliding operation, the bottom drive means can be switched into the freewheel condition and then may be easily entrained during sliding by the bottom surface 504 so as to not impair the sliding.

In many cases, the cable 508 to be embedded is irregularly laid out on the bottom 504 of the water body and extends there along curved lines or even in loops. Thereby, danger may occur that the embedding vehicle 516 overrides sections of the laid-out cable 508 and that then the mechanical loosening tools 572 will damage or destroy the cable. Moreover, the prelaid cable 508 may be covered by quick sand or the like in localized areas. These irregularities in the configuration and the covering of the prelaid cable 508 which is still to be embedded, react disturbingly on the embedding process. This is particularly true for the preferred mode of operation in which the flushing colter 548 is subjected to a predetermined downward biasing force, and the loosening tools are switched on when the flushing depth falls below a predetermined value. The aforedescribed irregularities in the configuration and covering of the prelaid cable 508 may cause, when the cable is passed through the flushing colter 548, considerable fluctuations of the mechanic cable tension and thus corresponding fluctuations of the biasing force acting on the flushing colter, and thus may disturbingly influence the above-described preferred mode of operation. In order to avoid problems of that kind, and to protect the cable against damaging by the loosening tools, cable feeding means are provided in the embodiment according to FIG. 4 to equalize the cable slack and the cable tension.

In the embodiment illustrated, the cable feeding means firstly comprise a cable localizing device 622 which is effective ahead of the forward end of the embedding vehicle 516. Thereby, possible obstacles and the configuration of the prelaid cable can be early recognized, and/or it is possible to employ simpler sensors having a small effective range only; this is particularly true if the cable localizing means 622 comprises a television camera. The cable localizing device 622 is movable under remote control. To that end, it is arranged, in the embodiment illustrated, at a cantilever device 546 which is hydraulically movable universally. In order that, if necessary, the cable localizing device 622 can be moved close to the prelaid cable 508, and to clean the cable of quick sand or the like, the cable localizing device 622 is provided with a flushing device 656 which in the simplest case consists of flushing nozzles.

The cable feeding means furthermore comprise a remotely-controllable cable handling device 658 arranged at the forward end of the embedding vehicle 516. With this device, the prelaid cable 508 can be lifted, gripped, and moved already ahead of the embedding vehicle 516. In this manner, for instance the cable may, upon the occurrence of excessively sharp bends or even loops, displaced sidewards into a smoother and less curved configuration. Also, the cable may be lifted therewith out of deposits, etc. In the embodiment illustrated, the cable handling device 658 is arranged at the same outrigger device 654 which also carries the cable locating device 622; of course, however, also separate outrigger devices may be provided.

The cable handling device 658 illustrated in FIG. 4 has a remotely controllable cable gripper 660 which may be closed around the cable 508 and may be hydraulically rotated in a pivot bearing 662 and opened and closed by means of hydraulic cylinders 664. Furthermore, flushing nozzles 666 are provided at the cable gripper 660 so that, if necessary, loose sediment layers which have deposited on the prelaid cable can be flushed away in order that the cable gripper has unrestricted access to the cable. By means of the cable gripper, also the prelaid cable may be straightened.

In the embodiment illustrated in FIG. 4, the outripper device 654 is rotatably supported in a pivot bearing 668 on the bridge 648 and can be rotated by means of a hyraulic cylinder 664. In many cases, however, such a rotatable supporting of the cantilever device 654 will not be necessary.

The cable feeding means furthermore comprise a cable slack compensating device 672 which is arranged on the embedding vehicle 516 and is effective to maintain a predetermined, essentially constant mechanical pulling tension in the cable as it enters the flushing colter 548, so that the aforedescribed preferred mode of operation with a freely movable, biased flushing colter will not be disturbed by fluctuations of the mechanical cable tension.

The cable slack compensating device 672 comprises cable track 674 over which the cable 508 is guided to form an open loop; the loop may be extended by moving the cable track away. In the embodiment illustrated, the cable track 674 is designed arcuately and arranged at the end of a plunger 676 which may be vertically extended from a hydraulic cylinder 678. As it is appropriate, cable guiding rollers 680 and 682 are rotatably supported on the embedding vehicle at positions ahead of and behind the cable track, respectively; the cable 508 will be guided over those guiding rollers out of the cable guide device 546 and into the flushing colter 548, respectively.

In operation, the hydraulic cylinder 678 is subjected to an essentially constant pressure so that the cable track 674 will exert an essentially constant pulling force on the cable 508, and will equalize possible fluctuations of the cable slack by extending and retracting movements. If the plunger 676 reaches its maximum extension, the embedding vehicle 516 may be steered sidewards into a curved path in order to reduce the excessive cable slack again to values which are within the compensating capability of the cable slack compensating device 672. This process may be also easily performed automatically.

The cable track 674 may be biased also by other means, for instance by a buoyancy body, a constant tension winch, or the like.

The mechanical cable tension may be appropriately supervised by at least one measuring device which preferably is arranged between the movable cable track 674 and the flushing colter 548 and/or within the flushing colter.

Arranging the cable slack compensating device 672 on the embedding vehicle 516 offers the particular advantage that the free steerability of the embedding vehicle and thus the high flexibility of operation are not impaired.

It will be understood that the embodiment according to FIG. 4 in other respects may also be provided with all the devices which have been described in connection with the other Figures.

Other embodiments are possible without leaving the scope of the invention. For instance, particularly the caterpillar drives illustrated in the Figures, e.g. the caterpillar drive 24, 26 of FIGS. 1 and 2, may be replaced by sliding skids, wheels, or the like; other loosening tools may be employed, etc.

I claim:

1. A method for embedding a cable or the like into an underwater ground in which method the cable is introduced into a zone of reduced density which is produced progressively in the underwater ground by a flushing process, and upon meeting with ground formations which are only insufficiently loosened by the flushing process, the underwater ground is mechanically loosened in the flushing area during performing the embedding process said mechanical loosening being performed in an area which is, in the embedding direction, disposed ahead of the center of the flushing area, wherein the mechanical loosening is automatically controlled in dependence upon the flushing depth so that it is initiated if the flushing depth obtained with the flushing alone becomes smaller than a predetermined minimum value, the mechanical loosening is performed to a working depth which is larger than the minimum value but smaller than the maximum flushing depth obtainable with soft ground formations, and the mechanical loosening is terminated when the flushing depth has exceeded the working depth of the mechanical loosening over a predetermined period of time.

2. The method of claim 1, wherein that two levels of intensity of the mechanical loosening are selectable, and the higher intensity level is used if during operation at the lower intensity level the pulling force which is necessary for proceeding with the embedding process exceeds a predetermined switching value.

3. The method of claim 2, wherein that the loosening at the higher intensity level is performed with a penetration depth dependent upon the degree of loosening obtained, and the loosening is terminated when the penetration depth has exceeded the predetermined switching value over a predetermined period of time.

4. The method of claim 3, wherein the initiating and terminating of the loosening at the higher intensity level is effected automatically.

5. An apparatus for embedding a cable and the like in an underwater ground, comprising an embedding vehicle which is movable, particularly drivable, on the underwater ground, and comprises a guiding device being in a guiding relationship with the cable to be embedded, and a flushing colter adapted to be set to different flushing depths below the vehicle, the flushing colter comprising at least one cable channel and being provided with flushing nozzles, the flushing colter preferably being pivotable about a transverse axis of the embedding vehicle and thereby adjustable to different flushing depths, and the embedding vehicle (16) is additionally provided with a mechanically acting ground loosening device (72) which comprises at least one loosening tool (74) and may be selectively put into operation.

6. The apparatus of claim 5, wherein the ground loosening device (72) is disposed in the flushing area of the flushing colter (48).

7. The apparatus of claim 5, wherein the additional ground loosening device (72) is arranged ahead of the flushing colter (48), as seen in the embedding direction (18).

8. The apparatus of claim 5, wherein the flushing colter (48) is adapted to be subjected to a predetermined downward biasing force and to be urged upwards against that biasing force, and the mode of operation of the embedding apparatus is controllable in dependence upon the flushing depth (t) of the biased flushing colter so as to counteract a dropping of the colter flushing depth (t) below a predetermined minimum value ($t_{min}$).

9. The apparatus of claim 8, wherein the colter biasing force decreases as the colter flushing depth (t) decreases.

10. The apparatus of claim 9, in which at least one hydraulic cylinder is provided for raising and lowering the flushing colter, characterized in that for supplying the hydraulic cylinder (66), a pressure control device (68) is provided to establish in the embedding operation a desired dependence of the biasing force upon the flushing depth (t) of the flushing colter (48).

11. The apparatus of claim 9, in which the flushing colter is rotatably supported about a transverse axis of the embedding vehicle, wherein the weight distribution of the flushing colter (48) with respect to the transverse axis (50) is designed to produce the desired dependence between the colter flushing depth (t) and the downwardly directed biasing force.

12. The apparatus of claim 8, wherein the flushing colter is supported at the embedding vehicle via at least one spring.

13. The apparatus of claim 8, wherein with colter flushing depths (t) which are greater than the minimum value ($t_{min}$), the mode of operation of the embedding apparatus is controllable independently of the colter flushing depth (t).

14. The apparatus of claim 8, wherein the ground loosening device (72) is arranged to become automatically effective when the colter flushing depth (t) falls below the minimum value ($t_{min}$).

15. The apparatus of claim 14, wherein the ground loosening device (72) has a maximum working depth ($a_{max}$) which is greater than the minimum value ($t_{min}$) of the colter flushing depth (t) but smaller than the maximum value ($t_{max}$) of the colter flushing depth obtainable in soft ground formations, and a signal generating device (sensor 124) is provided to produce a switch-off signal for the additional ground loosening device (72) when the colter flushing depth (t) is larger than the working depth of the loosening device.

16. The apparatus of claim 15, wherein a delay device only after a predetermined time period makes the switch-off signal effective to switch the loosening device (72) off.

17. The apparatus of claim 5, wherein the ground loosening device (72) comprises a plurality of kinds of loosening tools (74, 76) of different intensities, which may be selectively put into operation.

18. The apparatus of claim 17, wherein the additional loosening device (72) comprises at least one light tool (74) for loosening ground formations of moderate cohesion, as for instance boulder clay, and at least one heavy tool for loosening more solid ground formations as for instance lime stone.

19. The apparatus of claim 18, wherein the light tool (74) is arranged, as seen in the embedding direction (18), between the flushing colter (48) and the heavy tool (76).

20. The apparatus of claim 17, in which the ground loosening device (72) can be automatically made effective when the colter flushing depth (t) falls below the minimum value ($t_{min}$), wherein first the light tool (74) is automatically put into operation when the colter flushing depth falls below the minimum value ($t_{min}$).

21. The apparatus of claim 20, wherein a switch-on signal for the heavy tool (76) is produced, and the heavy tool put into operation, when the pulling force (F) exceeds a predetermined switching value ($F_s$).

22. The apparatus of claim 21, which is adapted to produce a switch-off signal for the heavy tool (76) if the pulling force falls below the switching value ($F_s$).

23. The apparatus of claim 21, wherein the heavy tool (76) is subjected to a downwardly directed biasing force, and means are provided to generate the switch-off signal for the heavy tool (76) upon reaching the maximum extension depth ($s_{max}$) of the heavy tool (76).

24. The apparatus of claim 22, which comprises a delay device which makes the switch-off signal effective only after a predetermined delay in time for switching-off the heavy tool.

25. The apparatus of claim 5, wherein at least one tool flushing nozzle (82) is associated with a number of loosening tools.

26. The apparatus of claim 5, wherein loosening tools which may transmit undesirable vibrations to other parts of the embedding vehicle and/or the cable, are supported in vibration-dampening fastening means (86).

27. The apparatus of claim 5, wherein the ground loosening device (72) comprises tool fastening means (98, 102) adapted for the attachment and convenient exchange of different loosening tools.

28. The apparatus of claim 5, which it comprises at least one controllable tool setting device (90, 92) by which at least one loosening tool (74, 76) is displaceable between an operative position in which the tool engages the bottom of the water body, and an ineffective rest position.

29. The apparatus of claim 5, wherein the advancing speed of the embedding vehicle is controllable in dependence upon the flushing depth of the colter so that the advancing speed is reduced if the flushing depth (t) of the colter becomes smaller.

30. The apparatus of claim 5, wherein the weight and the weight distribution of the embedding vehicle are controllably variable by means of trimming cells (106, 108) which may be selectively blown empty.

31. The apparatus of claim 5, wherein an observation chamber (110) adapted to house at least one operator is provided at the embedding vehicle (16) and comprises a control station for the observation and manual influencing and/or control of the embedding apparatus (2).

32. The apparatus of claim 31, wherein a second control station (116) is provided on a barge (22) which accompanies the embedding vehicle (16), a signal connection being provided between the barge and the embedding vehicle.

33. The apparatus of claim 5, wherein the embedding vehicle (16) comprises controllable and direction-reversible drive means (28, 30) of its own.

34. The apparatus of claim 33, wherein the drive means comprise bottom drive means (24, 26) as well as flow drive means (32).

35. The apparatus of claim 5, wherein the embedding vehicle (16) comprises steering means controlled by the cable guiding means (46).

36. The apparatus of claim 5, wherein the advancing speed of the embedding vehicle (16) is controllable in dependence upon the curvature of the prelaid cable (8) ahead of the embedding vehicle so that when the radius of curvature of the cable becomes smaller than a predetermined value, the advancing speed is reduced to zero, and a signal is generated indicating that condition.

37. The apparatus of claim 5, wherein feeding means (622, 658, 672) are adapted to equalize cable slack and mechanical cable tension.

38. The apparatus of claim 37, wherein the cable feeding means comprise a cable locating device (622) effective ahead of the forward end of the embedding vehicle (516).

39. The apparatus of claim 38, wherein the cable locating device (622) is movable by remote control.

40. The apparatus of claim 38, wherein the cable locating device (622) is arranged at a remotely controlled outrigger device (654).

41. The apparatus of claim 38, wherein the cable locating device (622) comprises a flush-open device (656).

42. The apparatus of claim 37, wherein the cable feeding means comprise a remotely controllable cable handling device (658) arranged at the forward end of the embedding vehicle (516).

43. The apparatus of claim 42, wherein the cable handling device (558) comprises a remotely controllable cable gripper (660) adapted to be closed around the prelaid cable.

44. The apparatus of claim 42, wherein the cable handling device (658) is provided with flushing nozzles (662.).

45. The apparatus of claim 37, wherein the cable feeding means comprise a cable slack compensating device (672) arranged on the embedding vehicle (516).

46. The apparatus of claim 45, wherein the cable slack compensating device (672) comprises a cable track (674)

over which the cable (508) is guided to form a loop, and in that the cable track is movable so that the loop can be extended by moving the cable track away.

47. The apparatus of claim 5, wherein the embedding vehicle (516) comprises at least one lower sliding surface (660) on which the embedding vehicle may be supported on ground formations having little supporting capacity.

48. The apparatus of claim 47, wherein selectively feedable water outlet means (652) are provided in the sliding surface (650).

49. The apparatus of claim 47, wherein the embedding vehicle (516) comprises two pontoon bodies (640) which are arranged side by side and each comprise a sliding surface (650) below.

50. The apparatus of claim 47, wherein the embedding vehicle (16) has controllably steerable and directionally reversible drive means of its own, the drive means comprising a bottom drive, wherein the bottom drive is adapted to be selectively switched into a freewheel condition.

* * * * *